US009342659B2

(12) United States Patent
Niinistö et al.

(10) Patent No.: US 9,342,659 B2
(45) Date of Patent: May 17, 2016

(54) METHOD AND SYSTEM FOR CONTROLLING THE DISPENSATION OF MEDICATIONS FROM A MEDICATION DISPENSER

(71) Applicant: EVONDOS OY, Salo (FI)

(72) Inventors: Jyrki Niinistö, Halikko (FI); Mika Apell, Turku (FI)

(73) Assignee: EVONDOS OY, Salo (FI)

( * ) Notice: Subject to any disclaimer, the term of this patent is extended or adjusted under 35 U.S.C. 154(b) by 0 days.

(21) Appl. No.: 13/955,478

(22) Filed: Jul. 31, 2013

(65) Prior Publication Data

US 2014/0039672 A1 Feb. 6, 2014

(30) Foreign Application Priority Data

Jul. 31, 2012 (EP) .................................... 12178605

(51) Int. Cl.
*G06F 19/00* (2011.01)
*A61J 7/00* (2006.01)
*A61J 7/04* (2006.01)

(52) U.S. Cl.
CPC ........... *G06F 19/3462* (2013.01); *A61J 7/0076* (2013.01); *A61J 7/0409* (2013.01); *A61J 7/0427* (2015.05); *A61J 2205/30* (2013.01)

(58) Field of Classification Search
CPC ... G06F 19/3462; A61J 7/0076; A61J 7/0409; A61J 2205/30; A61J 7/0427
USPC .......................................... 700/232, 237, 240
See application file for complete search history.

(56) References Cited

U.S. PATENT DOCUMENTS

| | | | | |
|---|---|---|---|---|
| 4,971,221 | A | 11/1990 | Urquhart et al. | |
| 5,097,982 | A | 3/1992 | Kedem et al. | |
| 5,805,051 | A | 9/1998 | Herrmann et al. | |
| 6,529,446 | B1 | 3/2003 | de la Huerga | |
| 7,264,136 | B2 | 9/2007 | Willoughby et al. | |
| 8,019,417 | B2 | 9/2011 | Bornzin et al. | |
| 8,195,330 | B2 * | 6/2012 | Coe | 700/243 |
| 8,600,548 | B2 * | 12/2013 | Bossi et al. | 700/240 |
| 2002/0027507 | A1 | 3/2002 | Yarin et al. | |
| 2002/0067270 | A1 | 6/2002 | Yarin et al. | |
| 2003/0099158 | A1 | 5/2003 | De la Huerga | |
| 2004/0117062 | A1 | 6/2004 | Bonney et al. | |
| 2004/0158350 | A1 | 8/2004 | Ostergaard et al. | |
| 2005/0041531 | A1 | 2/2005 | Sekura | |
| 2005/0240305 | A1 | 10/2005 | Bogash et al. | |

(Continued)

FOREIGN PATENT DOCUMENTS

| | | | |
|---|---|---|---|
| EP | 2 026 298 | A1 | 2/2009 |
| EP | 2 457 550 | A1 | 5/2012 |

(Continued)

*Primary Examiner* — Michael K Collins

(74) *Attorney, Agent, or Firm* — Buchanan Ingersoll & Rooney PC

(57) ABSTRACT

The present invention provides a method and a system for controlling the dispensation of medications from a medication dispenser, which includes medication packages containing medications to be taken at predetermined taking times. The method comprises several steps, including providing the medication dispenser with a medication profile of a patient and notifying the medication dispenser of a period of absence of the patient. Thereafter, the medications that should be taken by the patient during the period of absence are determined and the appropriate medications delivered to the patient.

12 Claims, 2 Drawing Sheets

(56) References Cited

U.S. PATENT DOCUMENTS

| | | | | |
|---|---|---|---|---|
| 2005/0268909 | A1 | 12/2005 | Bonney et al. | |
| 2006/0071011 | A1 | 4/2006 | Varvarelis et al. | |
| 2007/0043469 | A1 | 2/2007 | Draper | |
| 2007/0185615 | A1 * | 8/2007 | Bossi et al. | 700/244 |
| 2007/0260487 | A1 | 11/2007 | Bartfeld et al. | |
| 2008/0059228 | A1 | 3/2008 | Bossi et al. | |
| 2008/0119958 | A1 * | 5/2008 | Bear | A61J 7/0481 700/244 |
| 2008/0215289 | A1 | 9/2008 | Sekura | |
| 2008/0290106 | A1 | 11/2008 | van der Klaauw et al. | |
| 2009/0030730 | A1 | 1/2009 | Dullemen et al. | |
| 2009/0198208 | A1 | 8/2009 | Stavsky et al. | |
| 2010/0045466 | A1 | 2/2010 | Sekura | |
| 2010/0127073 | A1 | 5/2010 | van Esch | |
| 2010/0215231 | A1 | 8/2010 | Bartfeld et al. | |
| 2010/0249997 | A1 | 9/2010 | Greyshock et al. | |
| 2010/0305967 | A1 | 12/2010 | Daya et al. | |
| 2011/0193705 | A1 | 8/2011 | Sekura | |
| 2012/0004770 | A1 | 1/2012 | Ooyen et al. | |
| 2012/0081225 | A1 | 4/2012 | Waugh et al. | |
| 2012/0083666 | A1 | 4/2012 | Waugh et al. | |
| 2012/0126958 | A1 | 5/2012 | Kim et al. | |
| 2012/0199650 | A1 | 8/2012 | Horst et al. | |
| 2012/0273087 | A1 | 11/2012 | Stavsky et al. | |
| 2013/0169798 | A1 | 7/2013 | Pellerin et al. | |
| 2014/0005826 | A1 * | 1/2014 | Apell et al. | 700/244 |
| 2014/0039672 | A1 * | 2/2014 | Niinisto et al. | 700/240 |

FOREIGN PATENT DOCUMENTS

| | | | |
|---|---|---|---|
| WO | WO 91/04726 | A1 | 4/1991 |
| WO | WO 00/7538 | A2 | 2/2000 |
| WO | WO 01/47466 | A1 | 7/2001 |
| WO | WO 02/078593 | A2 | 10/2002 |
| WO | WO 03/001337 | A2 | 1/2003 |
| WO | WO 2007/129318 | A2 | 11/2007 |
| WO | WO 2008/135823 | A1 | 11/2008 |
| WO | WO 2009/095904 | A1 | 8/2009 |
| WO | WO 2011/042840 | A1 | 4/2011 |
| WO | WO 2011/112606 | A1 | 9/2011 |
| WO | WO 2011/123931 | A1 | 10/2011 |
| WO | WO 2011/123933 | A1 | 10/2011 |
| WO | WO 2012/007411 | A1 | 1/2012 |

* cited by examiner

METHOD AND SYSTEM FOR CONTROLLING THE DISPENSATION OF MEDICATIONS FROM A MEDICATION DISPENSER

TECHNICAL FIELD OF THE INVENTION

The present invention relates to a method and system for controlling the dispensation of medications from a medication dispenser, which includes medication packages containing medications to be taken at predetermined taking times according to the preambles of the appended independent claims.

BACKGROUND OF THE INVENTION

Many medical conditions require long-term or permanent medication. A patient must usually take one or more medications in prescribed dosages and at certain time intervals. Various devices are known for assisting the patient in complying with his/her medical regimen. The most sophisticated devices are so-called medication dispensers, which dispense pre-packaged and labelled medication packages to provide the patient with the proper dosage of medications at a prescribed time. The medications are pre-packaged into packages according to the medical regimen of the patient, and are available from licensed pharmacies or directly from medication packaging units of a caregiver, e.g. communal health care. The labels of the medication packages may contain information about the patient, the content of the package, the time of the dosage and/or other information related to the medication or to the medication package.

Typically, the medication packages are arranged as a strip, which is inserted into a container of the medication dispenser either by the patient or a caregiver of the patient. The medication dispenser dispenses the packages by separating the packages from the strip one package at a time according to the information provided by the labels of the packages, or information stored in the medication dispenser. The medication dispenser allows the dispensation of medications to be monitored and controlled so that the patient, the caregiver or any other person having access to the system can be assured that the patient is taking the medications as prescribed.

Mostly such automated medication administration systems are used by users under long-term medication. The users however have different needs, which need to be taken into account in the automated systems. For instance, medications are different, some need to be taken according to a strict schedule and others do not necessarily need so tight routines to be followed. Moreover, users are different, they have different capabilities to take medication and administrate their care, and their routines in everyday life are different. Some users are still in the work life, some are retired and can have various degrees of activity. Some users may travel a lot while others are in home care.

A problem associated with known medication dispensers is that they do not support different nature of various medical regimens necessary for efficient and safe medical treatment. Indeed, typically medication needs to be taken at the right time and some medications should not be taken close to each other, e.g. if the medication is critically delayed, it must not be taken but the user must wait for the next medication.

Furthermore, some medications are dependent of each other, e.g. medication protecting stomach must be taken before the actual medication and there is a certain time period that needs to pass between the two intakes. These regimens make it hard to handle the medications easily, yet safely, in normal life, while going to work, travelling or going to different events.

Manual dispensers or trays for medication administration are known in the art and they can be easily carried along but then the medication has to be administrated manually. This means manual refilling work pill by pill for the caregiver or for the patient himself, which naturally increases the risk for a human mistake and reduces time available for other important health care tasks. On the other hand, taking medications may cause problems for people with memory problems, for example. The automated dispensers as mentioned above typically have only one fixed program to support medication, and cannot thus dispense medication according to the medical regimen if the user is not near the dispenser at all times. Automated dispensers, which take absence of the patient into account, do exist, but typically using them is neither easy nor safe.

OBJECTIVES OF THE INVENTION

It is the main objective of the present invention to reduce or even eliminate the prior art problems presented above.

It is an objective of the invention to provide a medication dispenser that takes into account the activity of the user, such as outings or travels. It is also an objective of the invention to provide a method for an automated dispenser that allows the user to have a life as normal as possible, despite the long-term medication. It is a further objective of the invention to provide a method and system that is easy and safe to use.

In order to realise the above-mentioned objectives, the method and system according to the invention are characterised by what is presented in the characterising parts of the appended independent claims. Advantageous embodiments of the invention are described in the dependent claims.

DESCRIPTION OF THE INVENTION

A typical method according to the present invention for controlling the dispensation of medications from a medication dispenser, which includes medication packages containing medications to be taken at predetermined taking times, comprises:

- providing the medication dispenser with a medication profile of a patient, the medication profile comprising taking periods for the medication packages, the taking periods being linked to information on labels of the medication packages,
- notifying the medication dispenser of a period of absence of the patient,
- determining the medications that should be taken by the patient during the period of absence, the step comprising for each considered medication package:
- reading information from a label of a medication package,
- determining a taking period from the medication profile based on the information read from the label,
- comparing the taking period to the period of absence:
  - if the taking period is within the period of absence, then the medications of the medication package should be taken during the period of absence;
- delivering the medication packages containing the medications that should be taken by the patient during the period of absence out of the medication dispenser.

A typical medication dispenser system according to the present invention for controlling the dispensation of medications comprises:

a medication dispenser comprising at least a container arranged to receive a strip comprising packages of medication, each package having a label containing information relating to the package, a reader arranged to read information on a label of a package, transfer means for transferring packages from the container to the reader and then to an outlet of the medication dispenser, a control unit arranged to control the reader and the transfer means, whereby the medication dispenser system further comprises:

means for receiving a medication profile of a patient, the medication profile comprising taking periods for the medication packages, the taking periods being linked to information on labels of the medication packages, means for receiving a period of absence of the patient, means for determining the medications that should be taken by the patient during the period of absence, the means for determining being configured, for each considered medication package, to determine a taking period from the medication profile based on the information read from a label of a medication package, and to compare the taking period to the period of absence, wherein if the taking period is within the period of absence, then the medications of the medication package should be taken during the period of absence.

In other words, the present invention provides a method with which the patient can use an automated medication dispenser, safely and easily, yet still have a normal life with travels and outings. The method and the system based on the method thus support different patients with different capabilities, as the patient rights can be defined based on their capabilities to handle their medications, e.g. taking medicines for travel. The method according to one embodiment of the invention thus supports different patients with different capabilities. Even the absence state activation can be allowed for the patient remotely in the same manner as other rights, such as refilling the dispenser, by the caregiver. The medication dispenser then authorizes patients based on these settings, i.e. give rights to a patient to use the absence state of the medication dispenser. The right for local absence state activation by the patient can be configured remotely over a communications network. If the absence state is enabled, the patient can use a medication dispenser's local interface for delivering medication packages out of the medication dispenser for the time of absence. If the absence state is not enabled, typically the caregiver or other authorized person, e.g. a close relative, is given right to deliver medication packages out of the medication dispenser for the time of absence after authentication.

In this context the terms "taking period" and "medication window" should be considered to have the same meaning and content and they are completely inter-changeable with each other.

According to one embodiment of the invention the medication dispenser system comprises a server which is arranged in contact with the medication dispenser over a communications network. Typically all the information relating to medication profile, patient right management or the like is stored to the server. The server may comprise necessary memory unit for the purpose. Furthermore, preferably all the information, which is entered to the system locally, e.g. by using local interface of the medication dispenser is transferred to the server, the information on the server is updated accordingly and stored to the memory.

Moreover, the method supports different medication needs. Indeed, based on medical regimen or other medication specific information, which is available e.g. in a medication card, the caregiver can define how strict the schedule is and how close to each other the medications can be given to the patient. Setting the medication profile typically includes the step of defining the medication window. The available time range for the medication is defined based on the medication window around a nominal time. If the medication window has passed and the medications are missed, they are not usually given to the patient any longer. The medication profile is typically stored in the server of the system, from which it is provided to the medication dispenser, but it may be stored in the local memory unit of the medication dispenser, too.

Based on medical regimen or other medication specific instructions, the caregiver can also define which medications always need to be taken. This way, it is ensured that this medication is taken first, i.e. given priority over other medications. Furthermore, the different medications can be linked to each other, and thus they are treated as pair or as a group and given to the patient in a certain interval of time in a proper order of taking.

The method thus also supports different medication needs, as several different medication profiles may be set. These medication profiles can be set for the patient locally or remotely based on the information in a medical regimen or other medication specific information. The medication profile comprises information, for example, about required medication, medication windows for the required medication, etc. The medication profile may be received to the medication dispenser from a server over a communications network. The patient right management, e.g. right to enable an absence state of the medication dispenser, is also preferably server based and may be incorporated into the information of the medication profile. The medication dispenser can thus receive the patient rights from the server and manage the patient rights, for example based on patient authentication.

In medication profile configuration several factors affect the medication window, which may be for example strict, normal or flexible. Indeed, on one hand, some medications, e.g. for high blood pressure, must not be taken close to each other because it may lead to low blood pressure which is dangerous to health. Such medications must have very strict medication windows. Instructions for these medications advice the patient not to take critically delayed medication and the dispenser manages this automatically. For example, critically delayed medication is not delivered to the patient at all. The delayed medication may be stored inside the medication dispenser, for example, in a separate waste space. The medication dispenser may also send a message about delayed medication to the caregiver. On the other hand, some medications, e.g. medications to be taken once in a week like weekly medication for osteoporosis, should not be missed, thus the dispenser can automatically keep these medications available until the medication is taken. Yet another factor to consider when setting up the medication profile configuration is the dependencies between medications. Indeed, some medications must be treated as a pair or as an organized array, i.e. they must be taken in a predetermined order under predetermined time period. For example, medication that protects stomach against another medication, and thus it has to be taken certain time interval before the actual medication to have sufficient protective effect.

Typically, factory default settings for the system are optimised to be suitable for most of the patients as the default settings of their medication profile. This means that a medication profile does not necessarily need to be separately configured or changed but the default settings can be selected and used. In this case, the medication profile is provided by factory default settings.

The method and system supports normal life such as work, travelling and visiting friends. In a case where the medication schedule does not need to be strict but medications can be taken more flexibly, the medication windows do not need to be tight. In this case, the medication can be taken between daily routines or short trips.

One advantage of the present invention over prior art is that no manual administration of the medication is needed, as in the prior art. A further advantage is that no separate absence, e.g. travel, administration is necessarily required, as in prior art solutions. Yet another advantage is the versatility of medication profiles based on patient needs or capabilities, as several profiles are possible instead of the typical one profile of the prior known devices.

The medication dispenser typically reads the medication information from the package, including patient name, nominal taking time, medication names, etc. and follows the rules and information specified by the medication profile. A correctly configured medication profile thus enables the dispenser to automatically ensure that medication is delivered at the right time and safely. The medication dispenser system can ensure automatically that there is enough safety marginal between the packages to be dispensed. The safety marginal is dependent on the medication profile and proportional to the time between consequent or successive medications.

The notification of the period of absence can be made either by the patient himself or by the caregiver either directly to the medication dispenser or via a remote connection, such as via a server. The notification of the period of absence can be made, for example, locally by using the local interface of the medication dispenser, like a touch screen display or, alternatively, remotely via a web user interface.

The period of absence of the patient can be for example 30-60 min, 1-2 h, 2-5 h, 5-12 h, 12-24 h, 1-3 d, one week, two weeks, three weeks or more.

Additionally, the method supports absence, e.g. travel. Indeed, if the patient cannot be present in proximity of the medication dispenser when it is time to take the medication, he or his caregiver can put the dispenser to an absence state. In the absence state the medication dispenser first delivers the medication(s) for the period of absence and then refrains from giving local reminders during the period of absence. This may be done by simply entering the start time, return time or both to the medication dispenser, which then automatically gives out the right medication(s) for the period of absence. The start time and the return time may comprise information of the start or return date and the estimated start or return time. Typically the medication dispenser is put to the absence state simply by entering the return time, whereby the period of absence is assumed to start immediately from the ongoing moment. The dispenser is thereafter preferably disabled for the period of absence or arranged in a stand-by state for the period of absence and does thus not give local reminders. Instead, all the reminders may be sent from the system to the patient's mobile device.

According to one embodiment of the invention the medication dispenser system comprises a mobile medication dispenser to which the medication packages containing the medications that should be taken by the patient during the period of absence are transferred.

The method may further comprise transferring the medication packages containing the medications that should be taken by the patient during the period of absence to a mobile medication dispenser configured to dispense the medication packages. This eases handling of the medications during the period of absence, such as travel. The transfer of the medication packages may be done manually by the patient, caregiver or an authorized person, or the transfer of the medication packages may be done automatically. In automatic transfer of the medication packages the inlet of the mobile medication dispenser is connected to the outlet of the medication dispenser when activating the absence state of the medication dispenser. A correct number of medication packages are delivered from the medication dispenser directly to the mobile medication dispenser in a correct order. As an alternative option, the medication to be taken during the period of absence can be transferred from the medication dispenser manually to a separate travel container for medications. The mobile medication dispenser or travel container can also contain electronics where the information about the medication profile is downloaded from the system. The downloading of information may be performed locally by a local connection or remotely via the server. The local connection may be a wireless or wired connection.

The interface of the mobile medication dispenser may preferably also enable the patient to confirm the taking of medication during the period of absence. This confirmation may then be transferred to the medication dispenser or to the server over a communications network. Confirmation times may also be saved in the mobile medication dispenser and transferred to the medication dispenser or to the server via a local connection arranged between the medication dispenser and the mobile medication dispenser as the patient returns home. Thus the caregiver may control the proper taking of medication, possibly even remotely. The interface of the mobile medication dispenser may also provide the patient with simple reminders and/or notifications about the taking of medication.

The absence state activation need for short trips is also dependent on the medication window. Indeed, if the medication does not need strict medication windows, the absence state is not necessarily needed but the medication can be taken as the patient returns home. The medication dispenser is able to help to define medical care for the period of absence based on the medication profile, as it may activate the absence state automatically if needed or it may advice that medication can be still taken when the patient returns home.

The system may also be programmed to send a reminder about taking the medication(s) to mobile devices of the patient. Indeed, according to an embodiment, the method comprises notifying the patient to take medications during the taking periods. The notification may be sent to a mobile phone, to the mobile medication dispenser or other mobile devices.

The method preferably also comprises setting the medication dispenser into an absence state for the time of the period of absence. Thereby the system and device also has an absence state for supporting e.g. travel. In this case, the medication is given out for the right time and the medication dispenser is disabled or arranged in a stand-by state for the period of absence.

Preferably, the method also comprises checking that there are enough medication packages for the duration of the period of absence and communicating the need for more medication packages. The method can thus automatically make sure that there is/are enough medication(s) for the period of absence, e.g. travel. When entering period of absence, i.e. start and return times, or only the return time, to the system, the system automatically checks if there is enough medication packages in the medication dispenser for the period of absence. If there are not enough medication packages, the system informs the party responsible for supplying medications about an extra delivery need for the period of absence.

For persons travelling regularly or going to regular meeting(s), the method may also comprise setting the period of absence to occur regularly, thus making its use even simpler. Daily schedules can thus be defined for patients going to work or other events on a regular basis. In this case, the system can for example every morning offer medication packages automatically for the work time. This can be enabled by a one-time configuration.

According to an embodiment, the method comprises repeating the step of determining the medications that should be taken by the patient during the period of absence until a taking period of a medication package is outside the period of absence. Sometimes, a part of the medication window defined by the medication pro file is inside the period of absence. In these cases, there should be a sufficient part of the medication window outside the period of absence, i.e. after the predetermined return time, so that the medication is not accidentally left untaken because of delayed return. Typically, at least half of the medication window should be located after the end of the period of absence, so that the corresponding medication package is not delivered for the period of absence.

According to another embodiment, the information read from the label of the medication package comprises a taking time according to which the taking period is determined from the medication profile. The information from the label of the medication package may be used to connect the information of the medication profile and the medication package to each other, and for example the taking period may be determined or calculated around the nominal taking time of the medication according to the information disclosed in the label of the medication package.

The method may also comprise providing the mobile medication dispenser with the medication profile of the patient and/or the taking times read from the labels of the medication packages and/or the taking periods of the medication packages.

The taking period may be any appropriate time period, having length>0 s. The mobile medication dispenser may be activated to remind the patient during the taking period of the medication or only once at the nominal taking time.

The method may further comprise changing a starting point and/or an end point of a taking period based on the times at which the patient has taken medications. The method would thus enable re-setting the medication window if one medication has been missed.

The present method is useful for example in medication dispensers into which the medication is provided as a strip of medication packages. The strip may comprise one or more medication packages. The strip may comprise, for example, at least two medication packages, or the strip may consist of one medication package. In case the strip comprises two or more medication packages the medication packages in the strip may be physically connected to each other or the medication packages in the strip are separate from each other. According to one embodiment the medication packages are separate from each other, i.e. they are not physically connected to each other. The strip may be inserted into the container by the patient or a caregiver of the patient, such as a nurse or a near relative. The packages are arranged in the strip sequentially in time order. The packages of the strip are meant to be dispensed one package at a time according to the medical regimen. Each package contains a dosage to be taken at a prescribed time. The packages can be, for example, bags or cups made of plastic, or blister packages made of plastic or metal foil.

The label of the medication package contains package-related information. The label may contain identification information of the person to whom the packages are meant to be dispensed, such as his/her name or social security number, and/or information related to the medical regimen of the person, such as the content of the package, and the time of the dosage, i.e. the time at which the medications within the package should be taken. The information may be, for example, in a form of text, a one- or two-dimensional bar code, an RFID (radio frequency identification) or an NFC (near field communication) tag, or a magnetic tag. The label may be an inseparable part of the medication package, i.e. the information may be produced directly on the surface of the medication package. Alternatively, the label may be a separate tag or an adhesive label, which is attached to the medication package.

The first package of the strip may be transferred to the reader either manually by the patient or the caregiver, or automatically by transfer means of the medication dispenser. The transfer means are arranged to transfer packages from the container through the reader to an outlet of the medication dispenser. After the first package has been moved to the reader, the information on the label of the first package is read.

According to an embodiment the method comprises comparing the information read from the label of the first medication package with the information read from the label of the last medication package of the previous strip in order to determine if the medication packages of the strip can be dispensed to the patient. The information read from the labels may contain, for example, identification information and/or information related to the medical regimen. According to another embodiment the step of reading the information on the label comprises capturing an image of the label, and interpreting the image using optical character recognition and/or bar code recognition.

A typical medication dispenser useful for the method of the invention comprises a container arranged to receive a strip comprising packages of medication, each package having a label containing information relating to the package, a reader arranged to read information on a label of a package, transfer means for transferring packages from the container to the reader and then to an outlet of the medication dispenser, and a control unit arranged to control the reader and the transfer means. In a typical medication dispenser the control unit is arranged to compare the information read from the label of the first package with patient information stored in the medication dispenser in order to determine if the packages of the strip can be dispensed to the patient.

The medication dispenser is arranged to dispense medication packages to provide the patient with the proper dosage of medications at a prescribed time. The time at which the packages are to be delivered to the patient is read either from the labels of the packages or from a memory of the medication dispenser or from a server of the system. The medication dispenser allows the dispensation of medication to be monitored and controlled so that the patient, a caregiver of the patient or any other person having access to the medication dispenser can be assured that the patient is taking the medication as prescribed.

The control unit is connected to the reader and the transfer means, and arranged to control the reader and the transfer means so that one package at a time is dispensed at a determined time. The packages are transferred with the transfer means from the container to the reader and further to the outlet of the medication dispenser, from which outlet the patient can take the medications. The transfer means may comprise for example one or more rollers, which are driven by means of an electric motor. The electric motor is controlled by the control unit. The control unit comprises a processor that is programmed to carry out the functions that are needed to operate the medication dispenser. The control unit also comprises a memory for storing, for example, the patient information.

According to one embodiment of the invention the means for receiving a medication profile of a patient may be receiving means, which may wholly or partially be implemented by using computer program code means or software components configured for the purpose. According to one embodiment of the invention the means for receiving a medication profile of a patient comprises the control unit.

According to one embodiment of the invention the means for receiving a period of absence may be receiving means, which may wholly or partially be implemented by using computer program code means or software components configured for the purpose. The means for receiving a period of absence may comprise a local interface of the medication dispenser, like a touch screen display, and/or means for receiving the period of absence remotely via a web user interface. According to one embodiment of the invention the means for receiving a period of absence comprises the control unit.

According to one embodiment of the invention the Means for determining the medications that should be taken by the patient during the period of absence may be determining means, which may wholly or partially be implemented by using computer program code means or software components configured for the purpose. According to one embodiment of the invention the means for determining the medications that should be taken by the patient during the period of absence comprises the control unit.

According to one embodiment of the invention the means for receiving a medication profile of a patient, means for receiving a period of absence of the patient and/or means for determining the medications that should be taken by the patient during the period of absence may be incorporated to the control unit of the medication dispenser.

In case any changes relating to the medication profile, the period of absence or medications are entered to the system by using a local interface, the system may also comprise means for transferring the entered information to the server of the system via a communications network. The means for transferring the information may be transfer means, which may wholly or partially be implemented by using computer program code means or software components configured for the purpose.

According to one embodiment of the invention the medication dispenser may comprise means for interacting with the mobile medication dispenser. With these means for interacting it is possible to transfer information between the medication dispenser and the mobile medication dispenser. The means for interacting may be interaction means, which may wholly or partially be implemented by using computer program code means or software components configured for the purpose. The interaction means may also or in addition comprise any necessary receiver and transmitter means.

The medication package to be dispensed may be separated from the strip by a cutter and then transferred to the outlet. The cutter may also be arranged to open the package, whereby the medications can easily be taken out of the package. In some applications, the cutter is only arranged to cut the package open without separating the package from the strip. In this case, only the medications are delivered to the outlet. The outlet is preferably provided with a lid that may be lockable so that the access to the outlet by the patient or other persons can be prevented if desired, such as when the dispenser is in the absence state.

According to an embodiment the reader is an optical reader, an RFID reader or an NFC reader. The optical reader may be capable of reading text or a one- or two-dimensional bar code. The RFID and NFC readers are used to read RFID and NFC tags, respectively. The reader may also be based on the use of a so-called Hall sensor in case the tag is magnetic. Further, the reader may comprise a camera arranged to capture an image of the label, and the control unit is arranged to interpret the image using optical character recognition and/or bar code recognition.

The exemplary embodiments of the invention presented in this text are not interpreted to pose limitations to the applicability of the appended claims. The verb “to comprise” is used in this text as an open limitation that does not exclude the existence of also un-recited features. The features recited in the dependent claims are mutually freely combinable unless otherwise explicitly stated.

Being computer-related, it can be appreciated that the means or components disclosed herein may be implemented in hardware, software, or a combination of hardware and software. Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be executed by a processor. Components may be implemented separately in multiple modules or together in a single module.

BRIEF DESCRIPTION OF THE DRAWINGS

The novel features which are considered as characteristic of the invention are set forth in particular in the appended independent claims. The invention itself, however, both as to its construction and its method of operation, together with additional objects and advantages thereof, will be best understood from the following description of specific embodiments when read in connection with the accompanying drawings.

DETAILED DESCRIPTION OF THE DRAWING

The same reference signs are used of the same or like components in different embodiments.

Figure 1:
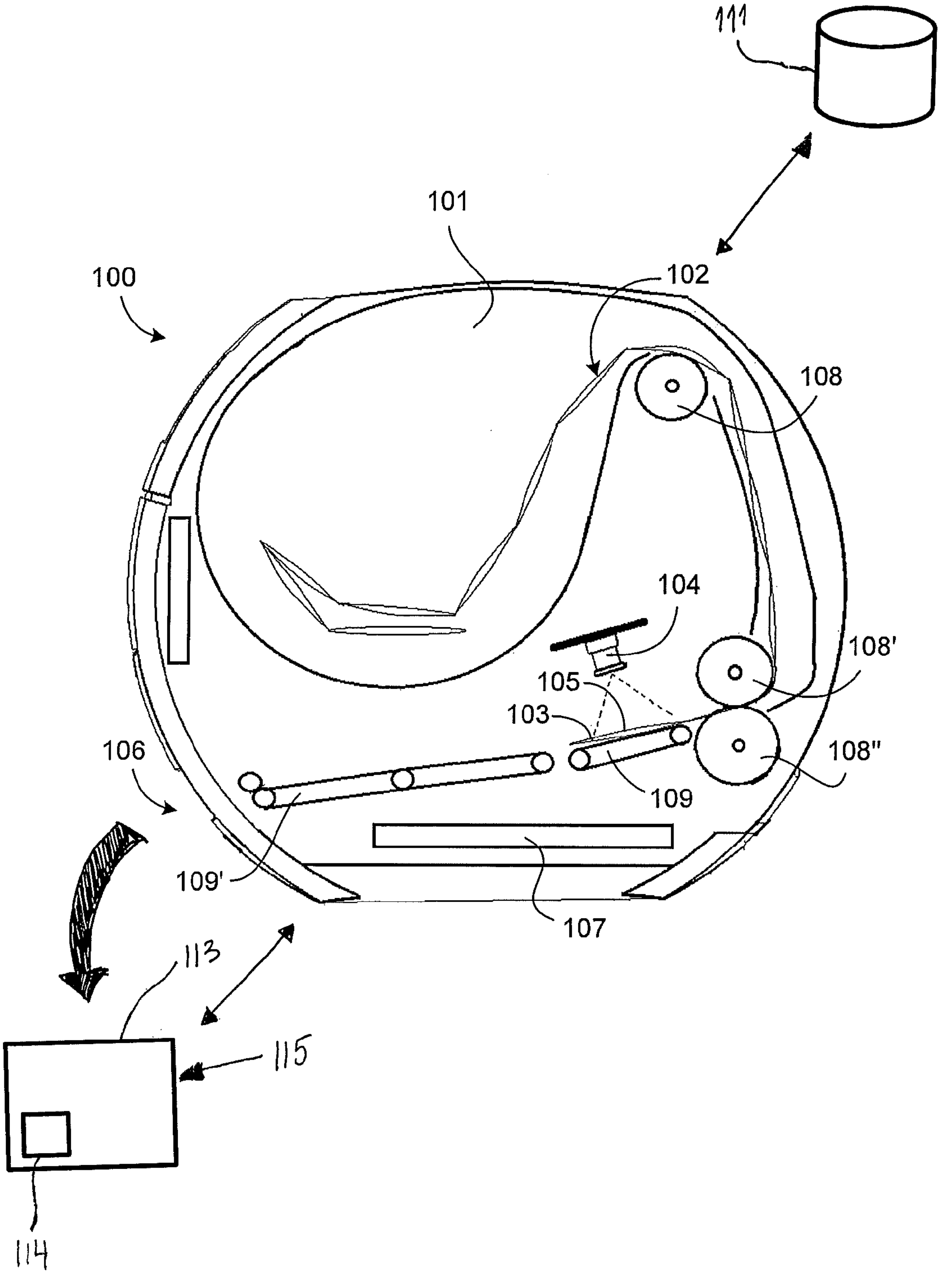
FIG. 1 illustrates a medication dispenser system according to an embodiment of the invention.

FIG. 1 illustrates a medication dispenser system according to an embodiment of the invention. The medication dispenser 100 comprises a container 101, which is arranged to receive a strip 102 comprising packages 103 of medication, and a reader 104 arranged to read information on a label 105 of the package 103. The medication dispenser 100 further comprises transfer means for transferring the packages 103 of the strip 102 from the container 101 to the reader 104 and then to an outlet 106 of the medication dispenser 100, and a control unit 107 arranged to control the reader 104 and the transfer means. The transfer means comprises rollers 108, 108', 108'', which are arranged to transfer the strip 102 from the container 101 to the reader 104, and roller tables 109, 109' or the like, which are arranged to transfer the strip 102 through the reader

104 so that information on a label of each package 103 can be read, and to transfer packages out of the medication dispenser 100.

The medication dispenser 100 of FIG. 1 comprises a camera as the reader 104. The camera has been arranged to capture an image of the label 105 of the package 103, when the strip 102 has been arranged on the roller table 109. The control unit 107 of the medication dispenser 100 has been arranged to interpret the image using optical character recognition and/or bar code recognition and to compare the information read from the label 105 of the package 103 with the patient information stored in the medication dispenser 100 in order to determine if the packages of the strip 102 can be dispensed to the patient.

The medication dispenser 100 is provided with a medication profile of a patient and notified about a period of absence of the patient, for example via a server 111 over a communications network. The medication profile comprises taking periods for the medication packages, and the taking periods are linked to information on labels of the medication packages. The medication dispenser 100 reads the medication information from the package 103, including patient name, nominal taking time, medicine names, etc. and follows the rules specified by the medication profile.

The medication dispenser 100 comprises suitable means for determining medications that should be taken by the patient during the period of absence or it is provided with the corresponding information. The medication dispenser 100 delivers the medication packages containing the medications that should be taken by the patient during the period of absence out of the medication dispenser 100. These medication packages 113 can be transferred to a mobile medication dispenser 115.

The medication dispenser 100 may comprise means with which it interacts with the mobile medication dispenser 115. For example, it may comprise receiver and transmitter means which are in contact via a communications network. The mobile medication dispenser 115 may comprise a local interface 114 for receiving information, such as reminder notification, and/or for entering data, such as notification acknowledgment.

Figure 2:
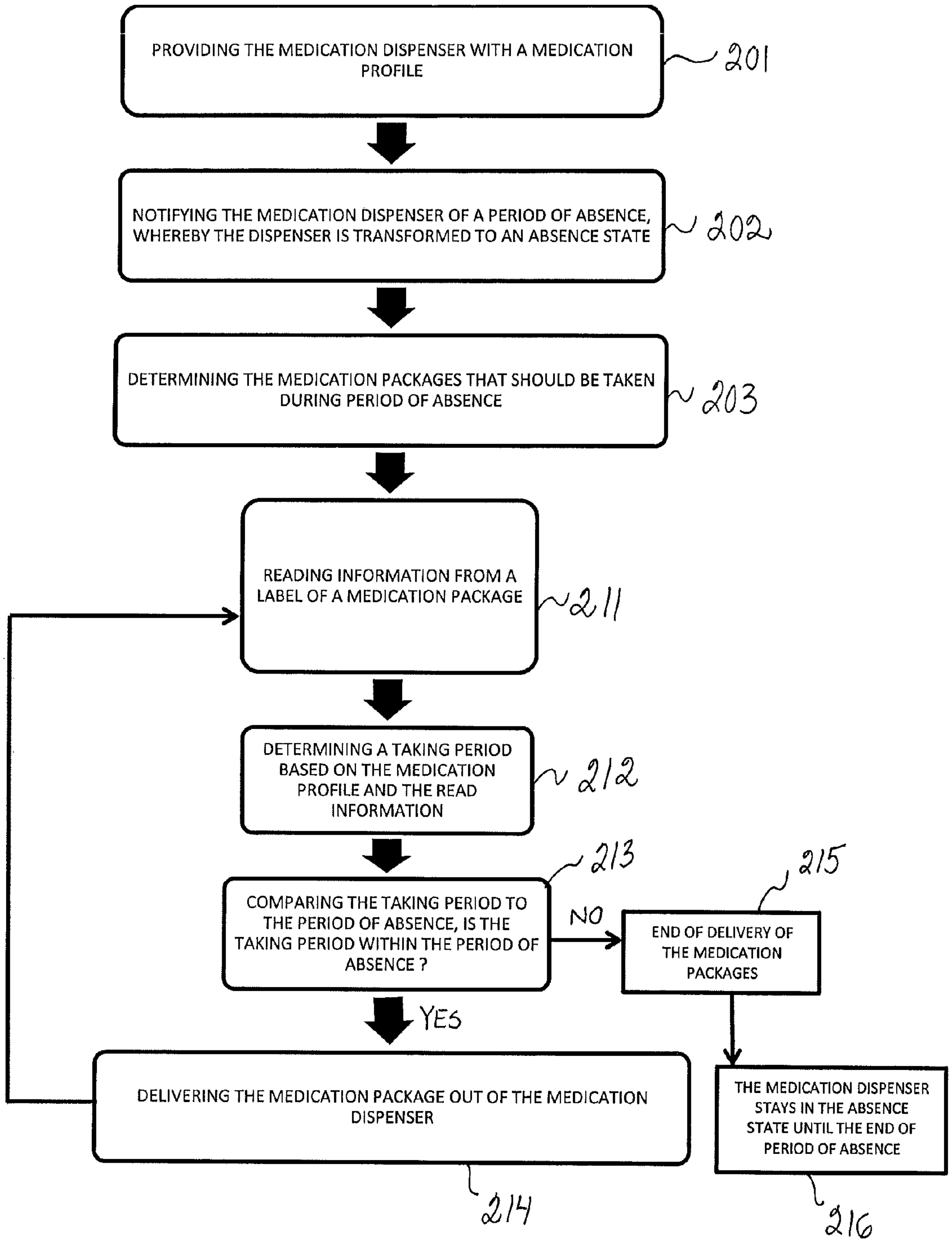
FIG. 2 illustrates a schematic diagram of a method according to an embodiment of the invention

FIG. 2 illustrates a schematic diagram of a method according to an embodiment of the invention. The method is meant for controlling the dispensation of medications from a medication dispenser 100.

At step 201 the medication dispenser 100 is provided with a medication profile, which comprises, inter alia, information about the taking periods of the medication packages 103.

At step 202 the medication dispenser system is notified of a period of absence of the patient. The period of absence may be notified by entering the return time and possibly also the start time by using the local interface of the medication dispenser or the period of absence may be notified by a system server via a connections network.

After receiving the information about the period of absence the medications that should be taken by the patient during the period of absence are determined at step 203 by repeating steps 211-214.

At step 211 the information from the label of the medication package 103 is read. Each medication package 103 has a label, which contains information relating to the package 103.

At step 212 the taking period of the medication package is determined based on the information in the medication profile and the information read from the label.

The taking period is then compared to the period of absence at step 213. If the period of absence is longer than the taking period, then the taking period is within the period of absence and the medication of the medication package should be taken during the period of absence. In that case the medication package is delivered out of the medication dispenser at step 214. The medication package may be directly transferred to a mobile medication dispenser which is connected to the outlet of the medication dispenser during the performance of the process described in FIG. 2.

Then the steps 211-213 are repeated as long as the taking period of the succeeding medication packages are within the period of absence or the overlap of the taking period and the period of absence exceeds the determined safety limit.

If the taking period is not within the period of absence or the overlap is smaller than the determined safety limit the process of delivering medication packages from the medication dispenser is ended at step 215. However, the medication dispenser stays in the absence state until the end of the period of absence, whereby no local reminders are given at step 216, but they may be transferred to a mobile device of the patient.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for controlling the dispensation of medications from a medication dispenser, which includes medication packages containing medications to be taken at predetermined taking times, the method comprising:

providing the medication dispenser with a medication profile of a patient, the medication profile comprising taking periods for the medication packages, the taking periods being linked to information on labels of the medication packages, notifying the medication dispenser of a period of absence of the patient, determining the medications that should be taken by the patient during the period of absence, the step comprising for each considered medication package:

reading information from a label of a medication package, determining a taking period from the medication profile based on the information read from the label, and comparing the taking period to the period of absence:

if the taking period is within the period of absence, then the medications of the medication package should be taken during the period of absence; and delivering the medication packages containing the medications that should be taken by the patient during the period of absence out of the medication dispenser.

2. The method according to claim 1, wherein the method comprises repeating the step of determining the medications that should be taken by the patient during the period of absence until a taking period of a medication package is outside the period of absence.

3. The method according to claim 1, wherein the information read from the label comprises a taking time according to which the taking period is determined from the medication profile.

4. The method according to claim 1, wherein the medication profile is received from a server over a communications network.

5. The method according to claim 1, wherein the method comprises transferring the medication packages containing the medications that should be taken by the patient during the period of absence to a mobile medication dispenser configured to dispense the medication packages.

6. The method according to claim 5, wherein the method comprises providing the mobile medication dispenser with the medication profile of the patient and/or the taking times read from the labels of the medication packages and/or the taking periods of the medication packages.

7. The method according to claim 6, wherein the medication profile and/or the taking times and/or the taking periods are received from the server and/or the medication dispenser over a communications network.

8. The method according to claim 1, wherein the method comprises notifying the patient to take medications during the taking periods.

9. The method according to claim 1, wherein the method comprises setting the medication dispenser into an absence state for the time of the period of absence.

10. The method according to claim 1, wherein the method comprises changing a starting point and/or an end point of a taking period based on the times at which the patient has taken medications.

11. The method according to claim 1, wherein the method comprises setting the period of absence to occur regularly.

12. The method according to claim 1, wherein the method comprises checking that there are enough medication packages for the duration of the period of absence and communicating the need for more medication packages.

* * * * *